United States Patent
Ma et al.

(10) Patent No.: US 12,131,143 B2
(45) Date of Patent: Oct. 29, 2024

(54) VERSION MANAGEMENT SYSTEM AND VERSION MANAGEMENT METHOD

(71) Applicants: Digiwin Software Co., Ltd, Shanghai (CN); DATA SYSTEMS CONSULTING CO., LTD., New Taipei (TW)

(72) Inventors: Xiaoliang Ma, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 297 days.

(21) Appl. No.: 17/839,489

(22) Filed: Jun. 14, 2022

(65) Prior Publication Data
US 2023/0325170 A1 Oct. 12, 2023

(30) Foreign Application Priority Data
Apr. 12, 2022 (CN) .......................... 202210377128.4

(51) Int. Cl.
*G06F 8/65* (2018.01)
*G06F 8/71* (2018.01)
*G06F 9/54* (2006.01)

(52) U.S. Cl.
CPC .................. *G06F 8/65* (2013.01); *G06F 8/71* (2013.01); *G06F 9/541* (2013.01)

(58) Field of Classification Search
CPC .............................. G06F 8/60–66; G06F 9/541
See application file for complete search history.

(56) References Cited

U.S. PATENT DOCUMENTS 9,262,237 B2 * 2/2016 Gopalraj ................ G06F 9/547
10,778,810 B2 * 9/2020 Forbes ..................... H04L 45/74
(Continued)

FOREIGN PATENT DOCUMENTS

JP 2017151824 A * 8/2017

OTHER PUBLICATIONS

Machine Translation of JP2017151824, Espacenet (online), 2024 [retrieved Jun. 1, 2024], Retrieved from Internet: <URL:https://worldwide.espacenet.com/publicationDetails/description?CC=JP&NR=2017151824A&KC=A&FT=D&ND=3&date=20170831&DB=EPODOC&locale=en_EP>, pp. 1-23.*

*Primary Examiner* — Todd Aguilera
(74) *Attorney, Agent, or Firm* — JCIPRNET

(57) ABSTRACT

A version management system and method are provided. The version management system includes a cloud server and a local server. When a first cloud application programming interface of a first local application programming interface corresponding to a first tenant is updated from a first version to a second version, a cloud version update module publishes first configuration data to be version updated to a configuration repository. When the cloud version update module judges that the first local application programming interface is updated from the first version to the second version through a local version update module, the cloud version update module updates a cloud version correspondence table. When the cloud server calls the first cloud application programming interface, a cloud configuration management module loads the first configuration data to be version updated, so that the cloud server executes the second version of the first cloud application programming interface.

16 Claims, 3 Drawing Sheets

(56) References Cited

U.S. PATENT DOCUMENTS

2015/0169386 A1\* 6/2015 Gopalraj .................. G06F 8/71
                                                                                       719/328
2018/0091624 A1\* 3/2018 Forbes .................... H04L 45/74

\* cited by examiner

VERSION MANAGEMENT SYSTEM AND VERSION MANAGEMENT METHOD

CROSS-REFERENCE TO RELATED APPLICATION

This application claims the priority benefit of China application serial no. 202210377128.4, filed on Apr. 12, 2022. The entirety of the above-mentioned patent application is hereby incorporated by reference herein and made a part of this specification.

BACKGROUND

Technical Field

The disclosure relates to a software management technology, in particular to a version management system and a version management method.

Description of Related Art

A common issue with conventional hybrid cloud systems that support multi-tenancy is version management. Due to inconsistent version update rhythms of application programming interfaces of local environments corresponding to different tenants, the application programming interfaces of the local environments have multiple versions coexisting for a period of time, and the application programming interfaces of local products of some tenants may even not be updated for a long time. From another perspective, in the hybrid cloud system that supports multi-tenancy, in the case where it is generally difficult to rely on a local end to implement a business function in the cloud, the version of an application program service (the application programming interface) in the cloud can be updated without restrictions. If the implementation of a function of a new version of the application programming interface in the cloud relies on that the application programming interface of the local end also needs to be implemented together, local systems of all tenants need to complete the version update before the overall system is considered to have completed the version update. However, if the overall system cannot implement the version update in time because the application programming interfaces of some tenants cannot cooperate with the version update in time, the tenants who have updated the version first will not be able to use the function of the new version of the application programming interfaces first. Furthermore, the management difficulty of the version update of the overall hybrid cloud system with multi-tenancy will be higher, which also greatly affects the version iteration speed of the system.

SUMMARY

The disclosure provides a version management system and a version management method, which can implement a version management function of a cloud application programming interface and a local application programming interface of an automatic hybrid cloud system.

According to an embodiment of the disclosure, the version management system of the disclosure includes a cloud server and a local server. The cloud server includes and executes a cloud version update module, a configuration repository, and a cloud configuration management module. The local server includes and executes, and is connected to the cloud server. When a first cloud application programming interface of a first local application programming interface corresponding to a first tenant is updated from a first version to a second version, the cloud version update module publishes first configuration data to be version updated to the configuration repository. When the cloud version update module judges that the first local application programming interface corresponding to the first tenant is updated from the first version to the second version through a local version update module, the cloud version update module updates a cloud version correspondence table. When the cloud server calls the first cloud application programming interface corresponding to the first tenant, the cloud configuration management module loads the first configuration data to be version updated from the configuration repository according to the cloud version correspondence table, so that the cloud server executes the second version of the first cloud application programming interface.

According to an embodiment of the disclosure, the version management method of the disclosure is applicable to a cloud server and a local server. The cloud server includes and executes a cloud version update module, a configuration repository, and a cloud configuration management module. The local server includes and executes a local version update module. The version management method includes the following steps. When a first cloud application programming interface of a first local application programming interface corresponding to a first tenant is updated from a first version to a second version, first configuration data to be version updated is published to the configuration repository through the cloud version update module. When the cloud version update module judges that the first local application programming interface corresponding to the first tenant is updated from the first version to the second version through the local version update module, a cloud version correspondence table is updated through the cloud version update module. When the cloud server calls the first cloud application programming interface corresponding to the first tenant, the first configuration data to be version updated is loaded from the configuration repository according to the cloud version correspondence table through the cloud configuration management module, so that the cloud server executes the second version of the first cloud application programming interface.

Based on the above, the version management system and the version management method of the disclosure can automatically and effectively manage the service software version of the hybrid cloud system.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
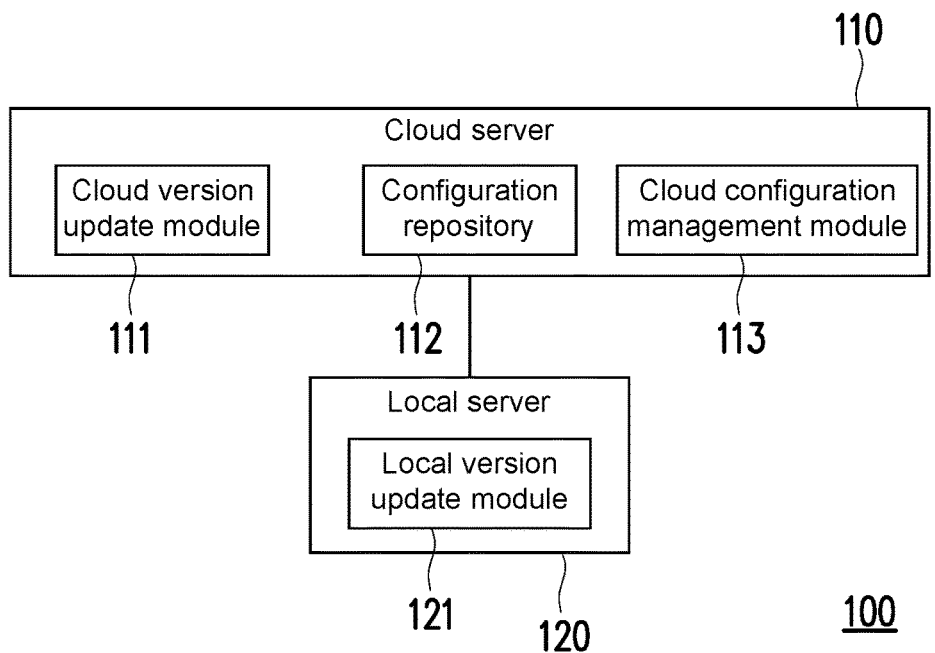
FIG. 1 is a schematic diagram of a version management system according to an embodiment of the disclosure.

Reference will now be made in detail to the exemplary embodiments of the disclosure, and examples of the exemplary embodiments are illustrated in the drawings. Wherever possible, the same reference numerals are used in the drawings and description to refer to the same or similar parts.

FIG. 1 is a schematic diagram of a version management system according to an embodiment of the disclosure. Referring to FIG. 1, a version management system 100 includes a cloud server 110 and a local server 120. The cloud server 110 is coupled to the local server 120 to form a hybrid cloud architecture. In the embodiment, the cloud server 110 includes a cloud version update module 111, a configuration repository 112, and a cloud configuration management module 113, and the cloud server 110 may further include and/or execute one or more application services corresponding to one or more cloud application programming interfaces (APIs). The configuration repository 112 is a database. The local server 120 includes a local version update module 121, and the local server 120 may further include and/or execute one or more application services corresponding to one or more local application programming interfaces. It is worth noting that the number of the local version update modules is not limited to that shown in FIG. 1. For example, if a local end includes multiple tenants, each tenant end is correspondingly provided with a local version update module.

In the embodiment, when the software version of the cloud application programming interface is updated, the cloud version update module 111 may publish configuration data to be version updated to the configuration repository 112, so that the configuration repository 112 may store the configuration data to be version updated of the cloud application programming interface, and also retains configuration data of the previous version of the cloud application programming interface. Moreover, when the software version of the local application programming interface is updated, the local version update module 121 may update a local version correspondence table, and the cloud version update module 111 may synchronously update a cloud version correspondence table, so that version record information of the local version correspondence table and the cloud version correspondence table remains consistent.

In this way, when a service caller calls the application service in the cloud, the cloud configuration management module 113 may load the configuration data to be version updated from the configuration repository 112, so that the cloud server 110 may execute the updated version of the cloud application programming interface, and the local server 120 may execute the updated version of the local application programming interface. Therefore, the updated version of the cloud application programming interface and the local application programming interface may be properly connected to provide the application service corresponding to a certain tenant. It is worth noting that the "service caller" may refer to a client (for example, a web page, a back-end service call initiated by an App user to execute a certain front-end operation) or a service call executed by another certain application service in a server (including a local application program and a cloud services application program). For example, there is a supplier information query service in the cloud, which may be an operation initiated by the client to query supplier information to call a cloud service to obtain relevant data or may also be that another supplier notification service in the cloud first calls the supplier information query service to obtain contact information during an execution process, and then sends a notification.

More importantly, if the version of the local application programming interface of another tenant has not been updated, since the configuration repository 112 still retains the configuration data of the previous version, the cloud configuration management module 113 may load the configuration data of the previous version from the configuration repository 112, so that the cloud server 110 may execute the previous version of the cloud application programming interface. Therefore, the cloud application programming interface and the local application programming interface may still be connected with the previous version and provide the application service corresponding to the other tenant. In this regard, if the cloud application programming interface has the function of downward compatibility, the service version is increased after the upgrade, but the same application programming interface is still implemented. Conversely, if the cloud application programming interface is not downward compatible, a new application programming interface is defined after the upgrade. Defining a new application programming interface is only an implementation manner, and a specific implementation manner of the disclosure may not define a new application programming interface, but deploy different services in multiple apparatuses to implement the same application programming interface, and then use routing for distribution according to the version used by the tenant.

In the embodiment, the cloud server 110 and the local server 120 may respectively include one or more servers, which are not limited to those shown in FIG. 1. The cloud server 110 shown in FIG. 1 is used to correspond to a public cloud environment, and the local server 120 is used to correspond to a private cloud environment. The cloud server 110 and the local server 120 may respectively include a processor and a storage device. The processor may include, for example, a central processing unit (CPU), other programmable general-purpose or specific-purpose microprocessors, digital signal processors (DSPs), application specific integrated circuits (ASICs), programmable logic devices (PLDs), other similar processing circuits, or a combination of the devices. The storage device may include a memory and/or a database, wherein the memory may be, for example, a non-volatile memory (NVM). A storage module may store relevant programs, modules, systems, or algorithms for implementing the embodiments of the disclosure to be accessed and executed by the processor to implement the relevant functions and operations described in the embodiments of the disclosure. In the embodiment, the cloud version update module 111, the configuration repository 112, the cloud configuration management module 113, and the local version update module 121 may be, for example, implemented by JavaScript Object Notation (JSON), extensible markup language (XML), YAML, or other similar programming languages, but the disclosure is not limited thereto. In an embodiment, the local environment of the version management system 100 may be, for example, composed of multiple servers of multiple private clouds corresponding to multiple tenants, and at least one of the servers may be provided with the local version update module 121 to manage multiple local application programming interfaces running in the servers.

Figure 2:
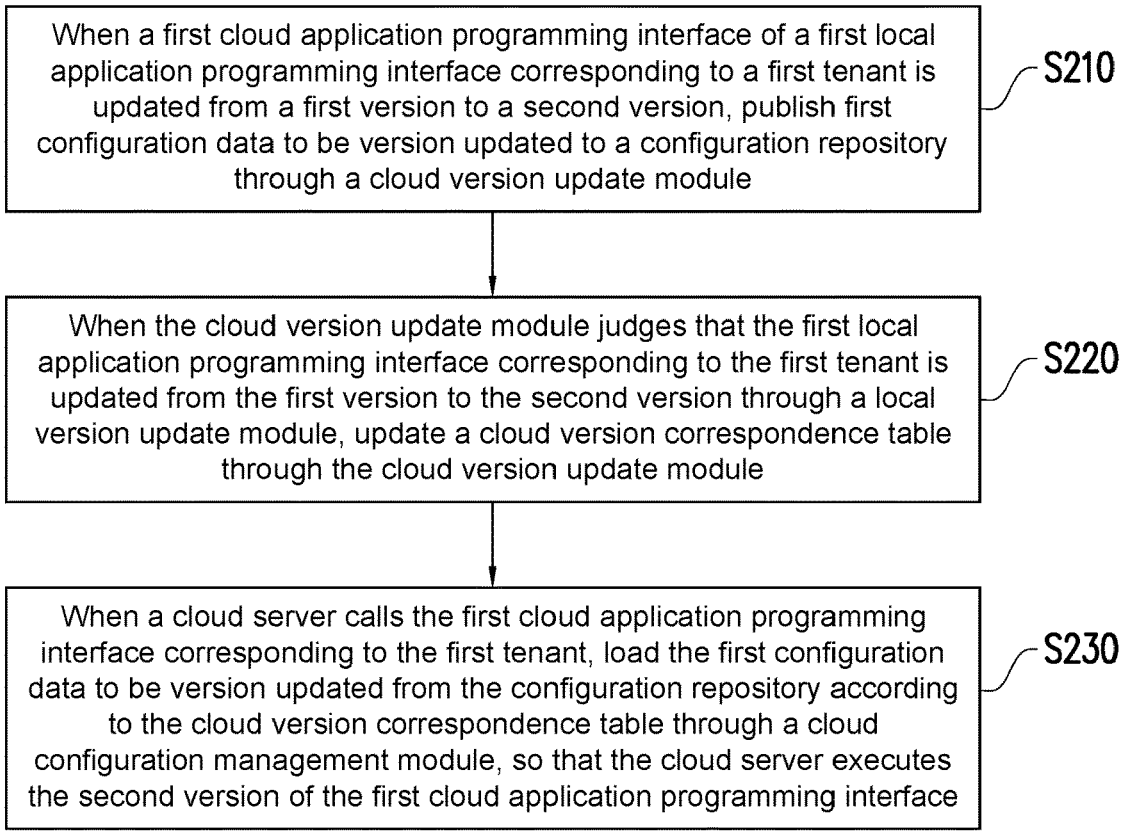
FIG. 2 is a flowchart of a version management method according to an embodiment of the disclosure.
Figure 3:
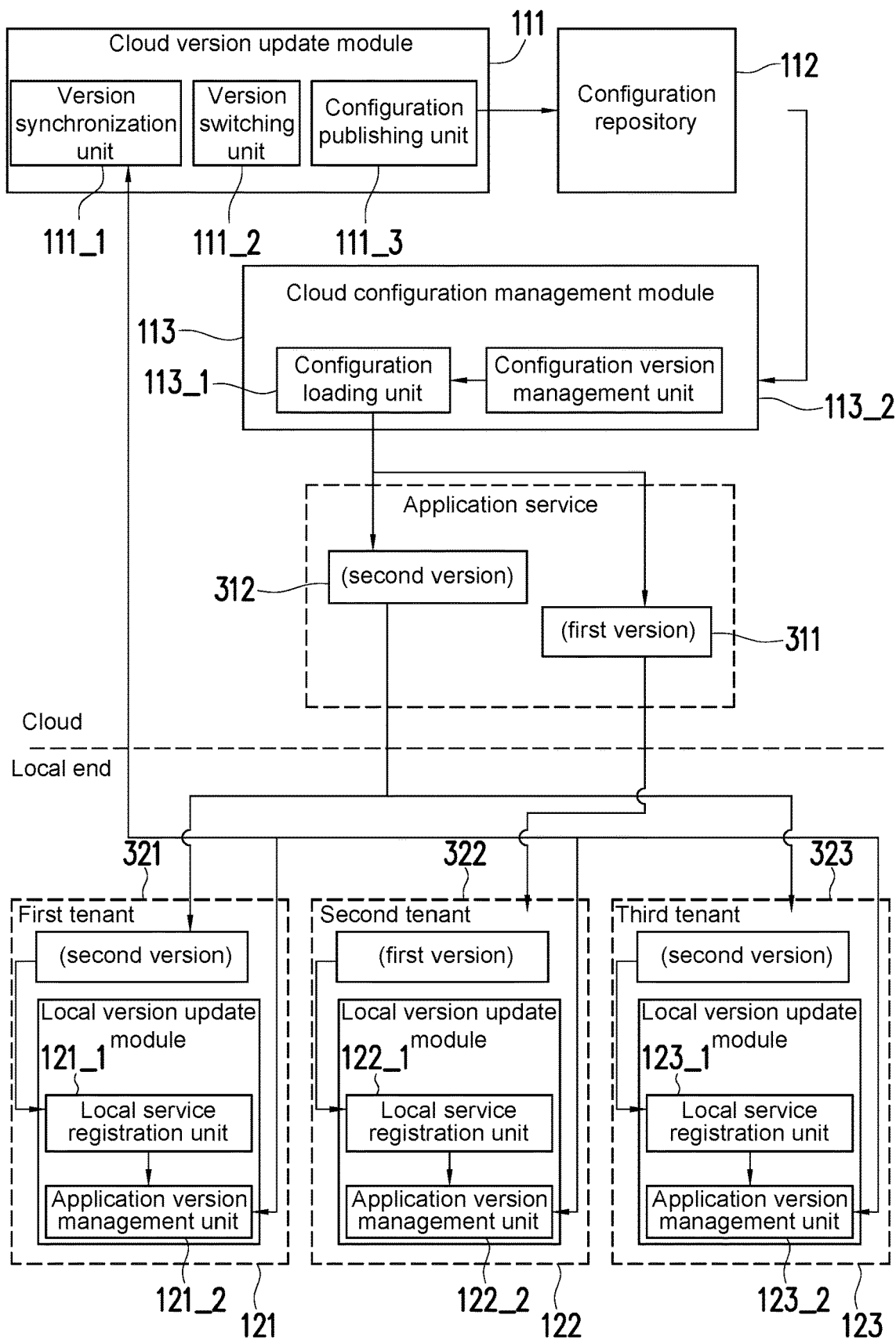
FIG. 3 is a schematic diagram of implementation of version management according to an embodiment of the disclosure.

FIG. 2 is a flowchart of a version management method according to an embodiment of the disclosure. FIG. 3 is a schematic diagram of implementation of version management according to an embodiment of the disclosure. Referring to FIG. 1 to FIG. 3, the cloud version update module 111 may include a version synchronization unit 111_1, a version switching unit 111_2, and a configuration publishing unit 111_3. A first tenant may be provided with the local version update module 121. A second tenant may be provided with a local version update module 122. A third tenant may be provided with a local version update module 123. The local version update modules 121 to 123 may include local service registration units 121_1 to 123_1 and application version management units 121_2 to 123_2. In the embodiment, the version management system 100 may execute version management in the following Steps S210 to S230. In Step S210, when a (first) cloud application programming interface of a first local application programming interface 321 corresponding to the first tenant is updated from a first version (old) to a second version (new), the cloud version update module 111 publishes the configuration data to be version updated to the configuration repository 112. Also, the configuration repository 112 stores the configuration data of the first version of the cloud application programming interface at the same time. In the embodiment, the configuration publishing unit 111_3 of the cloud version update module 111 may publish the configuration data to be version updated to the configuration repository 112. When local application programming interfaces 321 and 323 corresponding to the first tenant and the third tenant are updated from the first version to the second version, the local service registration units 121_1 and 123_1 may register corresponding to the second version of the local application programming interfaces 321 and 323 of the first tenant and the third tenant, and the application version management units 121_2 and 123_2 update respective local version correspondence tables. The local version correspondence table may be shown as Table 1 below. The local version correspondence table may record current version information of the local application programming interfaces corresponding to application services of the first tenant, the second tenant, and the third tenant, and may also record current version information of the local application programming interfaces of other applications corresponding to the first tenant, the second tenant, and the third tenant. The version management system and method of the disclosure can implement a version management function of multiple application programming interfaces corresponding to different tenants and different application services in a hybrid cloud system.

TABLE 1

| Tenant | Application service | Other application services |
| --- | --- | --- |
| First tenant | Second version | First version |
| Second tenant | First version | Third version |
| Third tenant | Second version | Second version |

In Step S220, when the cloud version update module 111 judges that the (first) local application programming interface 321 (and the (third) local application programming interface 323) corresponding to the first tenant (and the third tenant) is updated from the first version to the second version through the local version update module 121, the cloud version update module 111 updates the cloud version correspondence table. The version synchronization unit 111_1 of the cloud version update module 111 may detect the version of the local application programming interfaces 321 to 323 to judge whether the corresponding cloud application programming interfaces satisfy a switching condition. In this regard, the switching condition is that version numbers of all local application programming interfaces relied on by the corresponding cloud application programming interfaces are equal to or higher than version numbers required by the corresponding cloud application programming interfaces. For example, it is assumed that a cloud application programming interface A calls local application programming interfaces B1 and B2. In this regard, when the version of the cloud application programming interface A is A_v05 version, the version of the local application programming interface B1 needs to be B1_v03 version, and the version of the local application programming interface B2 needs to be B2_v04 version. When the version of the cloud application programming interface A is A_v06 version, the version of the local application programming interface B1 needs to be B1_v04 version, and the version of the local application programming interface B2 needs to be B2_v04 version. When the version of the cloud application programming interface A is A_v07 version, the version of the local application programming interface B1 needs to be B1_v05 version, and the version of the local application programming interface B2 needs to be B2 v05 version. At this time, the version of the cloud application programming interface A that may be used by different tenants may be respectively determined according to the version of the local application programming interface B1 and the local application programming interface B2. For example, when the version of the local application programming interface B1 is B1_v03 version, and the version of the local application programming interface B2 is B2_v04 version, the version of the cloud application programming interface A that may be used is A_v05 version. When the version of the local application programming interface B1 is the B1_v04 version, and the version of the local application programming interface B2 is the B2 v05 version, the version of the cloud application programming interface A that may be used is A_v06 version. In this regard, B2 v05 version of the local application programming interface B2 is actually higher than B2_v04 version required by A_v06 version of the cloud application programming interface A. The version of the local application programming interface B1 relied on by A_v07 version of the cloud application programming interface A needs to be B1_v05 version, but the current version of the local application programming interface B1 is only B1_v04 version. Therefore, the cloud application programming interface A cannot use A_v07 version, but can only use A_v06 version. In addition, in other embodiments of the disclosure, the switching condition may also be to uniformly control the version of multiple local application interfaces using an application program version of one local application program. In other words, if a local application service of a certain tenant needs to be version updated, relevant interfaces will be upgraded together, and the version of the group of interfaces is represented through a unified application program version number.

In the embodiment, when the cloud application programming interface satisfies the switching condition, the version switching unit 111_2 updates the cloud version correspondence table. The cloud version correspondence table may be shown as Table 2 below. The cloud version correspondence table may record current version information of the cloud application programming interfaces corresponding to application services of the first tenant, the second tenant, and the third tenant, and may also record current version information of the cloud application programming interfaces of other applications corresponding to the first tenant, the second tenant, and the third tenant. It should be noted that the local version correspondence table and the cloud version correspondence table are respectively updated when the local application programming interface of the local end and the cloud application programming interface in the cloud are updated, and the version information recorded by the two is consistent.

TABLE 2

| Tenant | Application service | Other application services |
| --- | --- | --- |
| First tenant | Second version | First version |
| Second tenant | First version | Third version |
| Third tenant | Second version | Second version |

In the embodiment, the cloud application programming interface may be first updated from the first version to the second version, and then the local application programming interfaces 321 and 323 are updated from the first version to the second version. Alternatively, in an embodiment, the local application programming interfaces 321 and 323 may be first updated from the first version to the second version, and then the cloud application programming interface may be updated from the first version to the second version. In other words, the disclosure does not limit the version update sequence of the application programming interfaces in the cloud and of the local end.

In Step S230, when the cloud server 110 calls (the second version of) a cloud application programming interface 312 corresponding to the first tenant, the cloud configuration management module 113 may load the configuration data to be version updated from the configuration repository 112 according to the cloud version correspondence table, so that the cloud server 110 executes the second version of the cloud application programming interface 312. In the embodiment, a configuration version management unit 113_2 of the cloud configuration management module 113 may read the configuration data in the configuration repository 112, and a configuration loading unit 113_1 may load the configuration data. Therefore, the cloud server 110 may execute the second version of the cloud application programming interface 312, and the local server 120 may execute the same second version of the local application programming interface 321 (and the local application programming interface 323) corresponding to the first tenant (and the third tenant). Therefore, the same second version of the cloud application programming interface 312 (and the local application programming interface 321) may be properly connected to provide corresponding application service functions.

In addition, when the cloud server 110 calls the cloud application programming interface 311 corresponding to the second tenant, the cloud configuration management module 113 may load the configuration data of the previous version from the configuration repository 112 according to the cloud version correspondence table, so that the cloud server 110 executes the first version of the cloud application programming interface 311. Therefore, the cloud server 110 may execute the first version of the cloud application programming interface 311, and the local server 120 may execute the same first version of the local application programming interface 322 corresponding to the second tenant. Therefore, the same first version of the cloud application programming interface 311 and the local application programming interface 322 may be properly connected to provide corresponding application service functions. In this way, the version management system 100 of the embodiment can be compatible with different versions of local application programming interfaces used by different tenants at the same time, so that application services will not be affected by the factor of the different versions of the local application programming interfaces used by the different tenants and unable to be executed.

Figure 4:
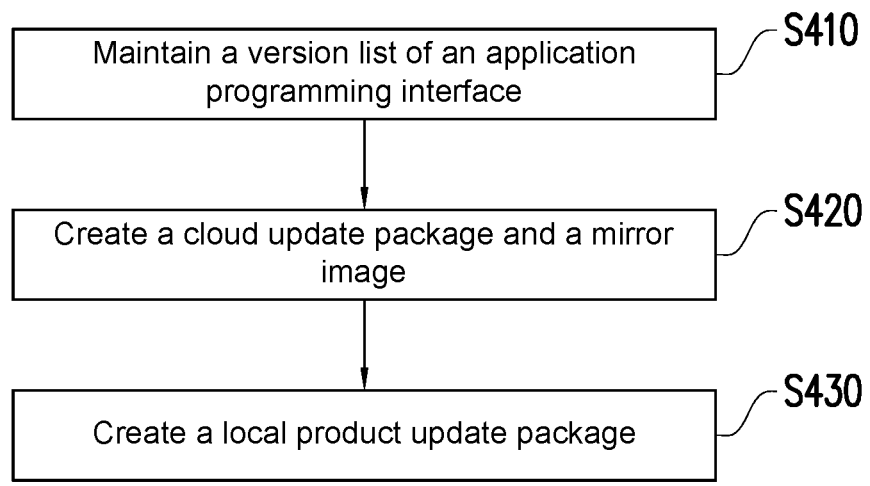
FIG. 4 is a flowchart of pre-preparation of version update according to an embodiment of the disclosure.

FIG. 4 is a flowchart of pre-preparation of version update according to an embodiment of the disclosure. Referring to FIG. 1 and FIG. 4, the version management system 100 may execute pre-preparation of version update in advance in the following Steps S410 to S430. In Step S410, the version management system 100 (or the user) may maintain a version list of the application programming interface to monitor and update the version information of the application programming interface in real time. In Step S420, the version management system 100 (or the user) may create a cloud update package and a mirror image. In this regard, a cloud configuration portion in an application development result may be packaged, and a cloud service is packaged into the mirror image to prepare for cloud version update. The cloud update package should include all cloud application programming interfaces and configuration data in application services to be version updated. In Step S430, the version management system 100 (or the user) may create a local product update package. In this regard, relevant local program files of local application programming interfaces in application services to be updated and files relied on by other products for running may be packaged into a product update package to prepare for local version update. In this way, the cloud server 110 and the local server 120 (or the user) may respectively perform automatic or manual version update operations according to the cloud update package and the local product update package.

In summary, the version management system and the version management method of the disclosure can automatically judge whether the versions of the cloud application programming interface and the local application programming interface are updated and whether the versions are consistent to determine the software version of the cloud application programming interface executed by the cloud server when calling the application service, so that the hybrid cloud system can still provide application service functions normally in the case where the progresses of version update of the cloud and local application programming interfaces of the hybrid cloud system are inconsistent.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A version management method, applicable to a cloud server and a local server, wherein the cloud server comprises a first processor, and the first processor is configured to execute a cloud version update module, a configuration repository, and a cloud configuration management module, and the local server comprises a second processor, and the second processor is configured to execute a local version update module, the version management method comprising:

in response to determining that a first cloud application programming interface of a first local application programming interface corresponding to a first tenant is updated from a first version to a second version, publishing first configuration data to be version updated to the configuration repository through the cloud version update module;

in response to determining that the cloud version update module judges that the first local application programming interface corresponding to the first tenant is updated from the first version to the second version through the local version update module, updating a cloud version correspondence table through the cloud version update module; and in response to determining that the first processor of the cloud server calls the first cloud application programming interface corresponding to the first tenant, loading the first configuration data to be version updated from the configuration repository according to the cloud version correspondence table through the cloud configuration management module, so that the first processor of the cloud server executes the second version of the first cloud application programming interface.

2. The version management method according to claim 1, further comprising:

in response to determining that a second cloud application programming interface of a second local application programming interface corresponding to a second tenant maintains the first version, and the first processor of the cloud server calls the second cloud application programming interface corresponding to the second tenant, loading second configuration data from the configuration repository according to the cloud version correspondence table through the cloud configuration management module, so that the first processor of the cloud server executes the first version of the second cloud application programming interface.

3. The version management method according to claim 1, wherein the step of updating the cloud version correspondence table through the cloud version update module comprises:

detecting a version of the first local application programming interface to judge whether the first cloud application programming interface satisfies a switching condition; and in response to determining that the first cloud application programming interface satisfies the switching condition, updating the cloud version correspondence table.

4. The version management method according to claim 3, wherein the switching condition is that version numbers of all local application programming interfaces relied on by the first cloud application programming interface are equal to or higher than a version number required by the first cloud application programming interface.

5. The version management method according to claim 3, further comprising:

in response to determining that the first local application programming interface of the first tenant is updated from the first version to the second version, updating a local version correspondence table through the local version update module.

6. The version management method according to claim 5, wherein the step of updating the local version correspondence table through the local version update module comprises:

in response to determining that the first local application programming interface corresponding to the first tenant is updated from the first version to the second version, performing registration for the second version of the first local application programming interface; and in response to determining that the registration is performed for the second version of the first local application programming interface, updating the local version correspondence table.

7. The version management method according to claim 1, wherein the first cloud application programming interface is first updated from the first version to the second version, and then the first local application programming interface is updated from the first version to the second version.

8. The version management method according to claim 1, wherein the first local application programming interface is first updated from the first version to the second version, and then the first cloud application programming interface is updated from the first version to the second version.

9. A version management system, comprising:

a cloud server, comprising a first processor, and the first processor is configured to execute a cloud version update module, a configuration repository, and a cloud configuration management module; and a local server, comprising a second processor, and the second processor is configured to execute a local version update module, and connected to the cloud server, wherein when a first cloud application programming interface of a first local application programming interface corresponding to a first tenant is updated from a first version to a second version, the cloud version update module publishes first configuration data to be version updated to the configuration repository, wherein when the cloud version update module judges that the first local application programming interface corresponding to the first tenant is updated from the first version to the second version through a local version update module, the cloud version update module updates a cloud version correspondence table, wherein when the first processor of the cloud server calls the first cloud application programming interface corresponding to the first tenant, the cloud configuration management module loads the first configuration data to be version updated from the configuration repository according to the cloud version correspondence table, so that the first processor of the cloud server executes the second version of the first cloud application programming interface.

10. The version management system according to claim 9, wherein when a second cloud application programming interface of a second local application programming interface corresponding to a second tenant maintains the first version, and the second cloud application programming interface corresponding to the second tenant is called, the cloud configuration management module loads second configuration data from the configuration repository according to the cloud version correspondence table, so that the first processor of the cloud server executes the first version of the second cloud application programming interface.

11. The version management system according to claim 9, wherein the cloud version update module comprises:

a configuration publishing unit, used to publish the first configuration data to be version updated to the configuration repository;

a version synchronization unit, used to detect a version of the first local application programming interface to judge whether the first cloud application programming interface satisfies a switching condition; and a version switching unit, used to update the cloud version correspondence table when the first cloud application programming interface satisfies the switching condition.

12. The version management system according to claim 11, wherein the switching condition is that version numbers of all local application programming interfaces relied on by the first cloud application programming interface are equal to or higher than a version number required by the first cloud application programming interface.

13. The version management system according to claim 9, wherein when the first local application programming interface of the first tenant is updated from the first version to the second version, the local version update module updates a local version correspondence table.

14. The version management system according to claim 13, wherein the local version update module comprises:
- a local service registration unit, used to perform registration for the second version of the first local application programming interface when the first local application programming interface corresponding to the first tenant is updated from the first version to the second version; and
- an application version management unit, used to update the local version correspondence table when the registration is performed for the second version of the first local application programming interface.

15. The version management system according to claim 9, wherein the first cloud application programming interface is first updated from the first version to the second version, and then the first local application programming interface is updated from the first version to the second version.

16. The version management system according to claim 9, wherein the first local application programming interface is first updated from the first version to the second version, and then the first cloud application programming interface is updated from the first version to the second version.

\* \* \* \* \*